March 24, 1970  E. A. NORGREN  3,502,872
AUTOMATIC SHUTTER CONTROL FOR AN X-RAY SPOT FILMER
Filed Sept. 8, 1967  5 Sheets-Sheet 1
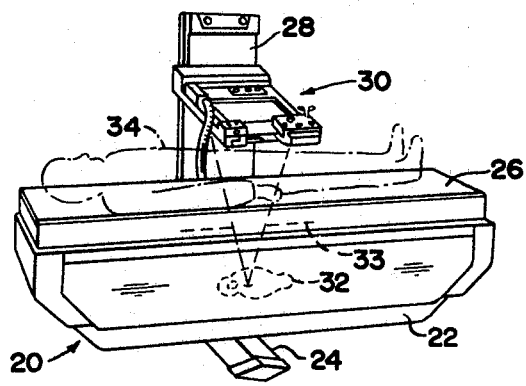
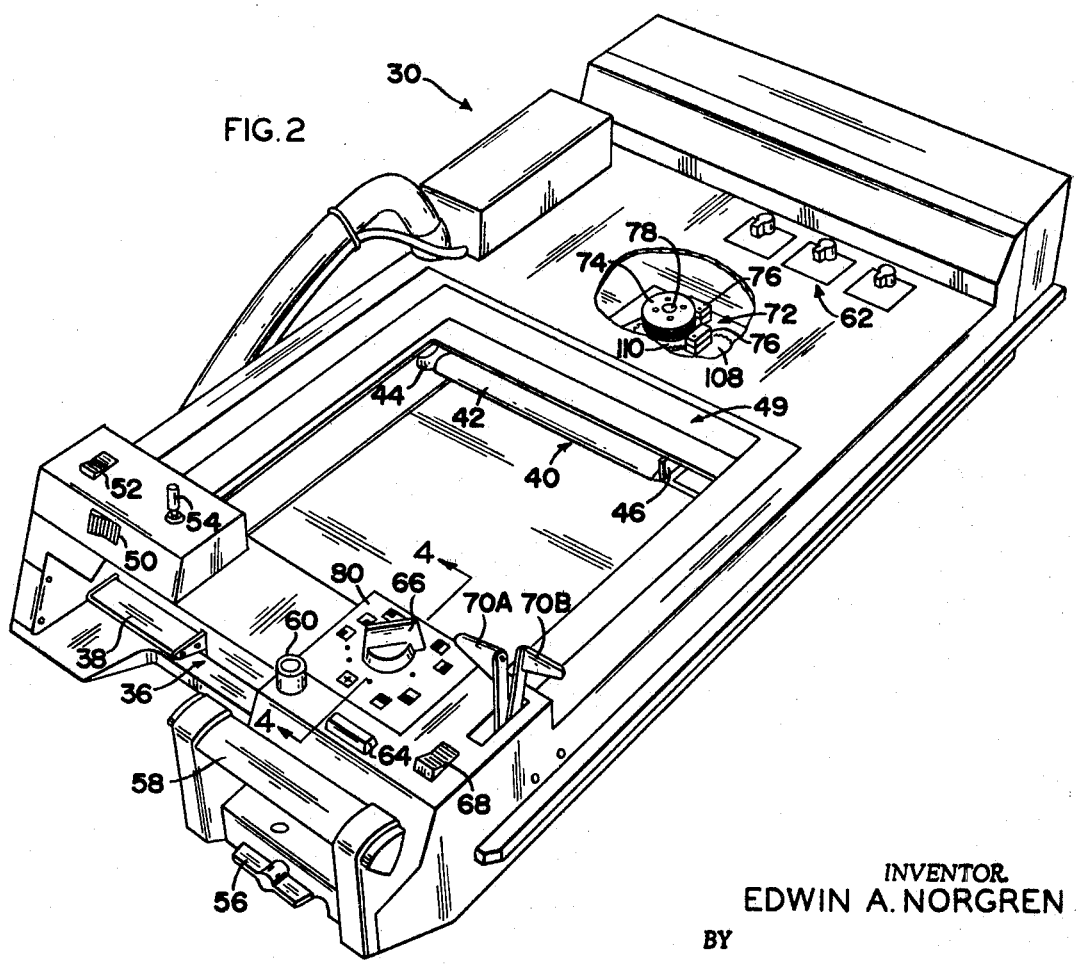
INVENTOR.
EDWIN A. NORGREN
BY
Watts, Hoffmann, Fisher & Heinke
ATTORNEYS.

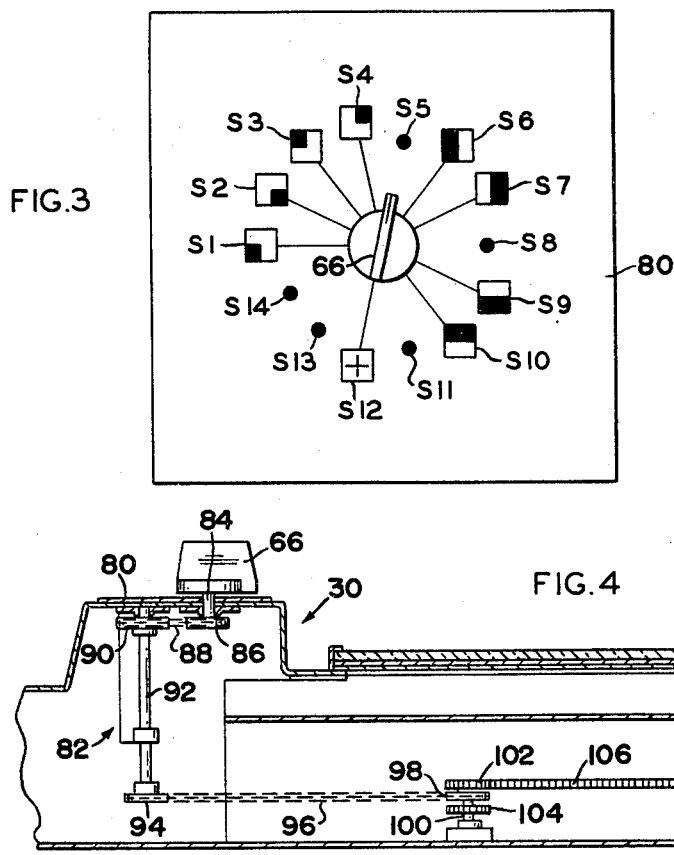

March 24, 1970　　　　E. A. NORGREN　　　　3,502,872
AUTOMATIC SHUTTER CONTROL FOR AN X-RAY SPOT FILMER
Filed Sept. 8, 1967　　　　　　　　　　　5 Sheets-Sheet 4
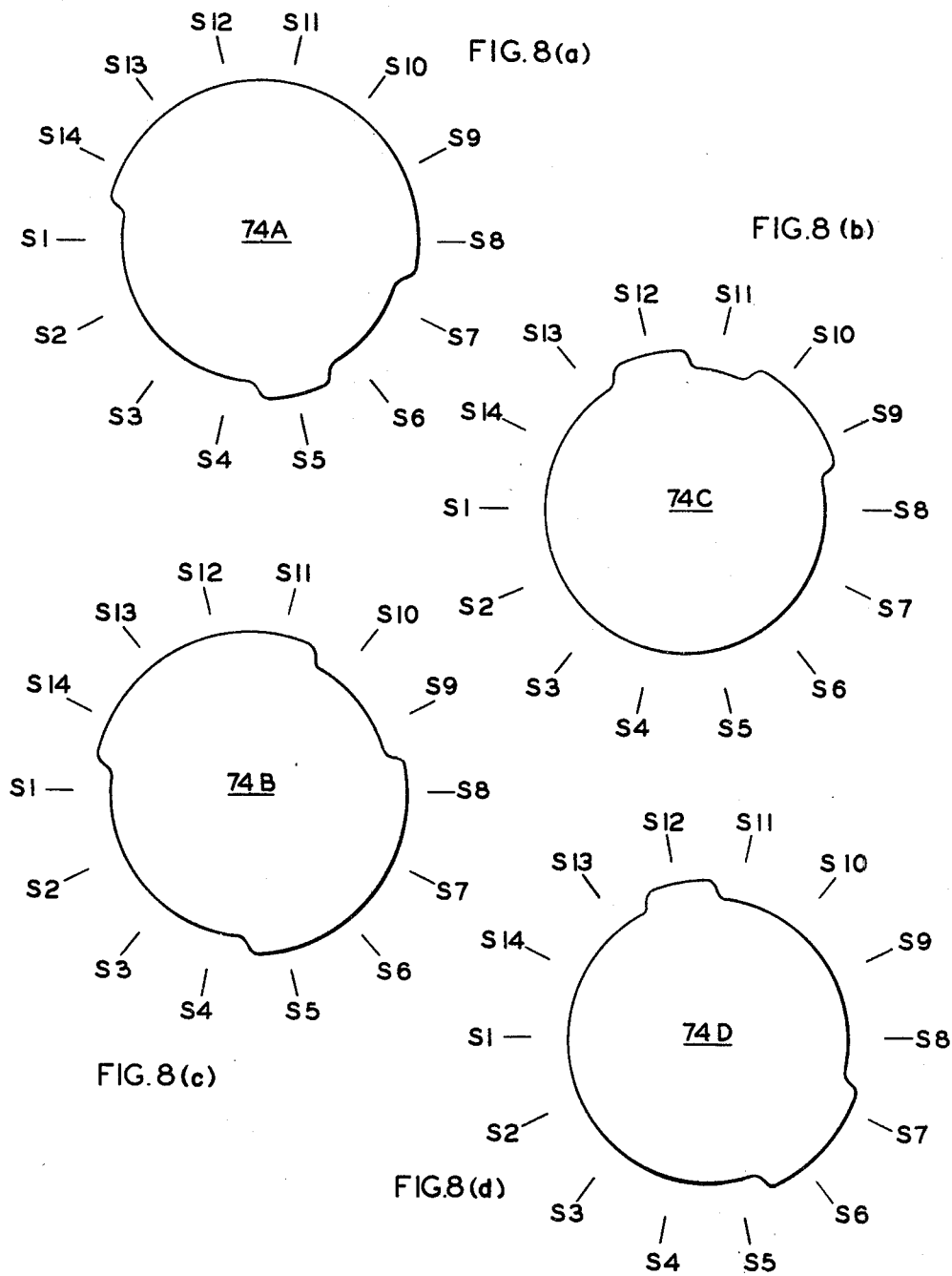
INVENTOR.
EDWIN A. NORGREN
BY
Watts, Hoffmann, Fisher & Heinke
ATTORNEYS.

March 24, 1970      E. A. NORGREN      3,502,872
AUTOMATIC SHUTTER CONTROL FOR AN X-RAY SPOT FILMER
Filed Sept. 8, 1967      5 Sheets-Sheet 5
FIG. 9
| | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| SWITCH 76A | U | U | U | U | A | U | U | A | A | A | A | A | A | A |
| SWITCH 76C | U | U | U | U | U | U | U | U | A | A | U | A | U | U |
| SWITCH 76B | U | U | U | U | A | A | A | A | U | U | A | A | A | A |
| SWITCH 76D | U | U | U | U | U | A | A | U | U | U | U | A | U | U |
A—ACTUATED      U—UNACTUATED
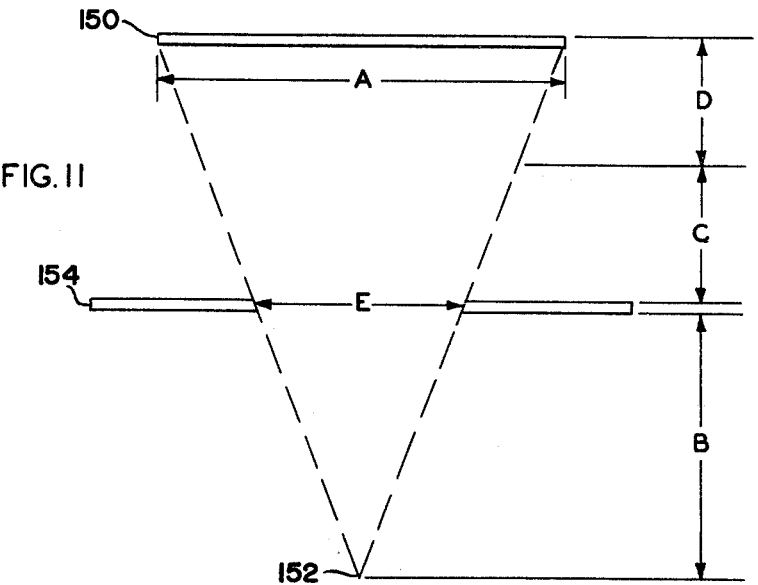
FIG. 11
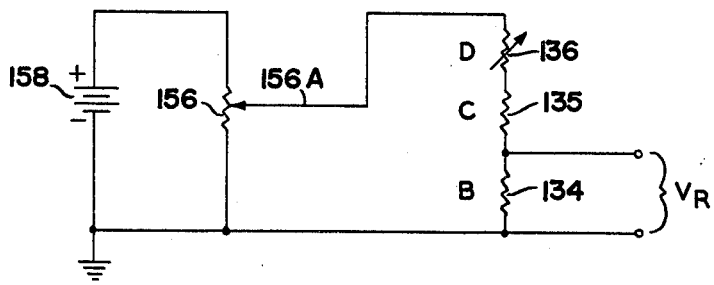
FIG. 12
INVENTOR.
EDWIN A. NORGREN
BY
Watts, Hoffmann, Fisher & Heinke
ATTORNEYS.

United States Patent Office 3,502,872
Patented Mar. 24, 1970

3,502,872
AUTOMATIC SHUTTER CONTROL FOR AN X-RAY SPOT FILMER
Edwin A. Norgren, Cleveland Heights, Ohio, assignor to Picker Corporation, White Plains, N.Y., a corporation of New York
Filed Sept. 8, 1967, Ser. No. 666,283
Int. Cl. H05g 1/60; G03b 41/16; G21f 5/02
U.S. Cl. 250—66                                24 Claims

ABSTRACT OF THE DISCLOSURE

Shutter opening is controlled automatically through a servo circuit to obtain various shutter openings required to maintain various predetermined image field sizes as sequences of X-ray exposures are made, different sequences including radiographs of different image field sizes.

REFERENCED PATENTS AND PATENT APPLICATIONS (1) U.S. Patent No. 3,173,008, issued Mar. 9, 1965 to Barrett et al. for "Spot Filmer";

(2) U.S. patent application Ser. No. 660,962, filed Aug. 16, 1967 by Daniel F. Lombardo and entiled "Automatic Shutter Control";

(3) U.S. patent application Ser. No. 656,448, filed July 27, 1967 by E. A. Norgren and entitled "X-Ray Apparatus Including Counterbalancing Mechanism for Spot Filmer or the Like."

BACKGROUND OF THE INVENTION

Field of the invention

This invention relates to X-ray apparatus, and, more particularly, to automatically-operated shutters for use in such apparatus to obtain proper image field sizes as a programmed sequence of film exposures or radiographs is made.

Description of the prior art

In medical X-ray examinations, devices known as spot filmers are typically used. A spot filmer usually carries either a fluoroscopic screen or an image intensification tube in that situation where so-called "bright" fluoroscopy is employed. The spot filmer also includes a cassette carriage, which selectively positions a radiographic film-carrying cassette in the path of an X-ray beam.

One known spot filmer is that described and claimed in the referenced U.S. patent to D. M. Barrett et al. With that spot filmer, a selector switch is provided where the operator may select any one of four programs for exposing an X-ray film. These four programs are:

(1) A program where the X-ray film is exposed in four sequential radiographs each of which covers one quadrant of the film.

(2) A program in which the film in the cassett is exposed one-half on each of two exposure with the field size being delineated transversely of the spot filmer.

(3) Another sequence which divides the radiographic film into two equal parts is one in which the radiographs each cover a longitudinal half of the film.

(4) The final program is one wherein a single radiograph is taken which exposes the entire film.

While the referenced patent discloses a spot filmer adapted to accept a plurality of cassette sizes, other spot filmers are designed to accept and receive a single size square cassette. A typical square cassette is referred to as a 10 x 10 cassette in that its outside dimension is nominally ten inches by ten inches. The invention of this application will be described in the environment of a spot filmer which accepts square cassettes, it being recognized that with nominal modification the present invention can easily be adapted to a spot film device which accepts a plurality of cassette sizes.

Radiation from an X-ray tube passes through a quadrangular opening whose two dimensions are defined by opposite edges of two pairs of movable shutters. The radiation then passes through a portion of a patient under examination and impinges on a fluoroscopic screen, an image intensification tube or an X-ray sensitive film. In typical prior art practice, a physician or radiologist would conduct an X-ray fluoroscopic study until he sees a portion of the anatomy which he wishes to radiograph. If he wishes to divide the radiograph into four quarters, each being exposed separately, the typical radiographic size is what is referred to as a 4 x 4 being approximately four inches square. If the shutters have been opened to provide a full size fluorescent image of a type desired by the physician, he must then, with the prior art devices, manually adjust the shutters to approximtaely 4 x 4 and then take his radiographic series of four 4 x 4 exposures. Manual adjustment of the shutters is exceedingly difficult, if not impossible, without having a fluorescent image to guide the doctor, so that in many cases the shutters are in an "over open" condition. This expands the image to greater dimensions than those desired, so that sequentially-taken images on a single piece of film can overlap. In addition, it may expose the operator to the direct X-ray beam, if the field size is larger than the shielded portion of the spot filmer.

SUMMARY OF THE INVENTION

With the present invention, the shutter opening is set to provide an image field size at a spot filmer that accommodates and meets the personal preference of the particular radiologist using the apparatus. During fluoroscopy, the field size stays at this predetermined size.

For radiography, selector switch means is manually adjustable to select a program of sequentially-performed radiographic exposures, each of which exposures covers a different portion of a standard size square sheet of X-ray sensitive film. The sequence may consist of four exposures, each covering a different quarter of a full-size field, two exposures, each covering a different half of the full-size field divided transversely, or two exposures, each covering a different half of the full-size field longitudinally divided. Also, the selector may be set to provide one full field size exposure, and the radiologist's favorite preselected field size for fluoroscopy. During radiography, shutters interposed between an X-ray tube and a patient under examination are automatically adjusted in two dimensions to provide the selected field size. After each exposure sequence, the shutters are automatically returned to the preselected field size for fluoroscopy and remain so adjusted until another sequence or full-field exposure is selected.

Any sequence may be interrupted part-way-through and a new one chosen. Of course, if a sequence is interrupted, a new film-containing cassette must be provided before another sequence can be initiated.

The shutter control of the invention is preferably used in conjunction with the control described in the reference application of D. F. Lombardo. In the latter control, a novel servo mechanism is provided that maintains a desired image field size, irrespective of the distance between the spot filmer and the X-ray tube. The control of the present invention provides signals to analog circuitry disclosed in the Lombardo application that are proportional to desired image field dimensions. Other signals are provided that are proportional to distance of the image plane (in the spot filmer) from the X-ray tube. The analog circuitry produces signals that, through servo systems, position the shutters to provide the desired image size. In other words, the analog circuitry modifies the signals provided from the circuit of the present invention in accordance with varying distances from image plane to X-ray source.

BRIEF DESCRIPTION OF THE DRAWINGS

FIGURE 1 is a perspective view of an X-ray apparatus that may embody the present invention;

FIGURE 2 is a perspective view, with a portion broken away, of a spot filmer embodying the control of the present invention;

FIGURE 3 is a plan view of a selector plate showing the various exposure sequences available;

FIGURE 4 is a sectional view, with parts omitted for the sake of clarity, taken on the line 4—4 of FIGURE 2 showing the selector mechanism;

FIGURE 5 is an elevation view of cam mechanism embodied in the invention;

FIGURES 8(a) through 8(d) are plan views of the four cams shown in FIGURES 5, 6 and 7;

FIGURE 9 is a table illustrating the condition of switches shown in FIGURES 6 and 7 in response to actuation by the cams shown in FIGURES 5-8;

FIGURE 11 is a diagram useful in understanding the geometric considerations involved in practicing the invention; and FIGURE 12 is a simplified schematic drawing of circuitry for developing a reference voltage that is a function of an image field dimension and distance between the image plane and an X-ray tube.

DESCRIPTION OF THE PREFERRED EMBODIMENT

Figure 6:
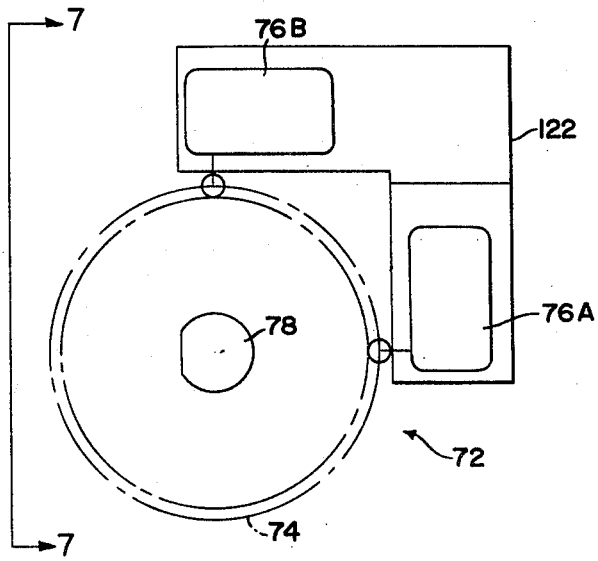
FIGURE 6 is a diagrammatic plan view of the cam mechanism shown in FIGURE 5.

As seen in FIGURE 1, an X-ray table, shown generally at 20, includes a body portion 22 mounted on a pedestal 24 and having a top 26. The top 26 is shown as horizontal in FIGURE 1. The table body 22 is movable from the position shown to a position wherein the top 26 is vertical. With a so-called 90—90 table, the body is tiltable in either direction about a horizontal axis until the top 26 is in a vertical position.

The table 20 includes the usual tower or mast assembly 28, which is movable longitudinally and transversely with respect to the table top 26 to various positions along the table. The tower 28 carries a spot filmer shown generally at 30. The spot filmer 30 is movable reciprocally in the usual manner toward and away from the table top 26.

The tower 28 also carries an X-ray tube 32 positioned within the body 22 of the table 20. The tube 32 is positioned to emit selectively a beam of X-rays, which pass through a variable-size opening defined by two pairs of movable shutters, indicated generally by the numeral 33. The shutters are of conventional type well-known in the art and serve to define various preselected image field sizes. The X-ray beam then passes through a portion of the body of a patient 34 disposed on the table top 26, and stimulates a fluoroscopic screen, an image intensification tube, or a photographic film, any of which may be carried by the spot filmer 30.

The spot filmer 30 is shown in detail in FIGURE 2. It is of the front-loading type, having a front load opening shown at 36. The filmer is equipped with a cassette eject bar 38, which ejects a cassette from the spot filmer whenever a cassette tray 40 is in a load position at the front of the spot filmer. The cassette tray is shown at the rear of the spot filmer in rest or park position. The cassette tray 40 includes a body portion 42, which is guided into position in a cassette carriage (not shown) by means of flanges 44, 46. A well or recess 49 is also provided in the spot filmer to accommodate an image intensification tube (not shown).

Other parts of the spot filmer shown include a cassette park and load switch 50, a lock switch 52 for a bucky tray carried in the table, a toggle switch 54 for a power top on the table, and a table tilt switch 56. A power assist handle 58 is provided, as is a button 60 for energizing compression locks. A plurality of exposure control switches, shown generally at 62, are provided for controlling energization of the X-ray tube 32. A film advance button 64 is provided for causing the cassette tray to advance to an exposure position and the exposure to be made. A program selector switch knob 66 provides means for selecting any one of a plurality of exposure sequences. The action of the program selector switch knob 66 will be described in detail with reference to other figures. A "manual-automatic" switch 68 is provided for selecting either manual or automatic operation. When the switch 68 is in its manual position, the shutter opening (and the image field size) can be manually controlled by a pair of levers 70A, 70B. When the switch 68 is in its automatic position, the shutter opening and hence image field size is controlled by mechanism actuated by the selector switch knob 66. The switches and controls thus far mentioned, other than the manual-automatic switch 68, are known in the art, and may be made in accordance with the teachings of the referenced Barrett et al. patent.

Figure 7:
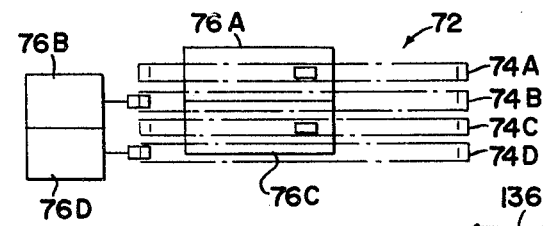
FIGURE 7 is a diagrammatic side view of the cam mechanism taken on the line 7—7 of FIGURE 6.

The spot filmer also contains a cam assembly, indicated generally by the numeral 72, shown in a broken-away portion of FIGURE 2 and in more detail in FIGURES 5, 6 and 7. The assembly 72 contains four cams 74 and an equal number of microswitches 76, which are respectively actuated by the cams. The cams 74 are mounted on a rotatable shaft 78, the rotational position of which is controlled both by the position of the selector switch knob 66 and by movement of the carriage that carries the cassette tray 40, when a sequence of exposures has been selected by means of the program selector switch knob 66. When the switch 68 is in its manual position, the microswitches 76 are disconnected from the electrical circuit that controls the shutter opening and image field size. When the switch 68 is in its automatic position, the opening of the shutters is controlled by the positions of the cams 74, as will be hereinafter explained in detail.

FIGURE 3 illustrates the markings that are provided either directly on the top surface of the spot filmer adjacent the selector switch knob 66 or on a selector plate, indicated generally by the numeral 80, that may be affixed to the top of the spot filmer under the switch knob 66. As shown, the selector plate 80 defines 14 positions or stations labeled S1–S14 to which the selector switch knob 66 may be manually set. Stations S1–S4 define a four-exposure sequence in which the four quadrants of the square sheet of X-ray sensitive film are individually exposed. The stations S6, S7 define an exposure sequence in which the film is exposed in two exposures with the image field divided transversely of the film. The stations S9, S10 define a two-exposure sequence in which the film is divided longitudinally. The station S12 indicates a full-image field size exposure. The stations S5, S8, S11, S13, S14 select exposures of the radiologist's favorite preselected field size for fluoroscopy.

If the selector switch knob 66 is set to the station S1, and the film advance button 65 (FIGURE 2) is depressed, an exposure will be made in the quadrant of the film shown in black at station S1. The selector switch knob 66 will then be automatically indexed to station S2 where a second exposure can be made. Similarly, exposures can be made at stations S3 and S4, after which the selector switch knob will be automatically indexed to station S5, where it will remain until it is manually set to another station. The selector switch knob 66 may be manually set to any station at any time, even though a sequence of exposures is interrupted by changing the setting of the switch. The action of the selector switch knob 66, insofar as it controls the mechanical positioning of the cassette carriage in the spot filmer, is well known and described in detail in the referenced patent of Barrett al. Hence, that function will not be described in detail herein.

FIGURE 4 illustrates a program selector switch mechanism 82, which is actuated by turning the program selector knob 66. The selector knob 66 is secured to one end of a shaft 84, to the other end of which is secured a sprocket gear 86. The sprocket gear 86 is engaged by a chain 88, which also engages a sprocket gear 90 secured to an idler shaft 92. The shafts 84, 92 are conventionally mounted in bearings secured to the spot filmer housing for free rotation.

The lower end of the idler shaft 92 carries another sprocket gear 94. The sprocket gear 94, through a chain 96, drives a sprocket gear 98 mounted on a shaft 100. The shaft 100 also carries a pinion gear 102 and a spur gear 104. The pinion gear 102 engages a control rack 106, so that as the program selector knob 66 is rotated, it causes the rack 106 to move back and forth from left to right as seen in FIGURE 4. The control rack 106 is connected to a detent indexing control and to sequence control cams, none of which are shown in the drawings. The detent indexing control and the sequence control cams control the movement of the cassette carriage throughout its various positions in a sequence of exposures. These controls are described in detail in the aforementioned Barrett et al. patent and that explanation will not be repeated here.

The gear 104 carried on the shaft 100 engages, either directly or through an idler gear 108, a gear 110 mounted on the shaft 78 in the cam assembly 72 (FIGURES 2 and 5). Thus, rotational movement of the program selector knob 66 also causes rotation of the shaft 78 and the cams 74 carried on the shaft.

Referring now to FIGURES 5, 6 and 7, it is seen that the cam assembly 72 comprises four cams 74A, 74B, 74C, 74D. The cams 74 are keyed to the shaft 78. The cams are separated from each other by suitable spacers 112, and are held in place on the shaft 78 by a snap ring 114 snapped on the shaft 78 above the cams 74. The shaft 78 also has secured thereto the gear 110, which is driven by the gear 104 shown in FIGURE 4. The gear 110 is separated from the cam 74D by a wide spacer 116 and from suitable bearings 118 by a spacer 120.

The cam assembly 72 also includes four microswitches 76A, 76B, 76C, 76D which are mounted on an offset plate 122. The switches are not shown in FIGURE 5 for the sake of clarity. The switches 76A, 76C are mounted one above the other and in proper position to be actuated by the cams 74A, 74C (FIGURE 7). The microswitches 76B, 76D are similarly mounted and are positioned to be actuated by the cams 74B, 74D. Because of the physical sizes of the microswitches 76, it is not convenient to mount them all vertically one above the other. Therefore, they are mounted in two groups which are displaced from each other substantially 90°, as best seen in FIGURE 6.

The bracket 122 on which the switches 76 are mounted is secured to one arm of a right-angle bracket 124 by means of a screw 126 threaded into a horizontal arm of the bracket 124. The bracket 122 is provided with an elongated aperture to receive the screw 126, so that the bracket 122 may be adjusted from right to left as seen in FIGURE 5. The angle bracket 124 is secured to another bracket 128 mounted on the base of the spot filmer. A screw 130 extends through an elongated opening in a vertical arm of the angle bracket 124 and is threaded into the bracket 128. By loosening the screw 130, the switches 76 mounted on the bracket 122 may be adjusted upwardly and downwardly as seen in FIGURE 5 to position them properly with respect to the cams 74.

FIGURES 8(a), 8(b), 8(c), 8(d), respectively, are plan views of the cams 74A, 74C, 74B, 74D. Although the cams 74A, 74C are actually rotationally displaced from the cams 74B, 74D by 90°, they are shown in FIGURE 8 as having the same rotational orientation for purposes of explanation. As shown, the cam 74A has lands at stations S5 and S8–S14. The cam 74C has lands only at stations S9, S10, S12. The cam 74B has lands at stations S5–S8 and S11–S14. The cam 74D has lands only at stations S6, S7, S12. It is at those stations having lands that the corresponding microswitch 76 is actuated. FIGURE 9 sets forth in tabular form the various conditions of the microswitches at the selector knob stations S1–S14.

Figure 10:
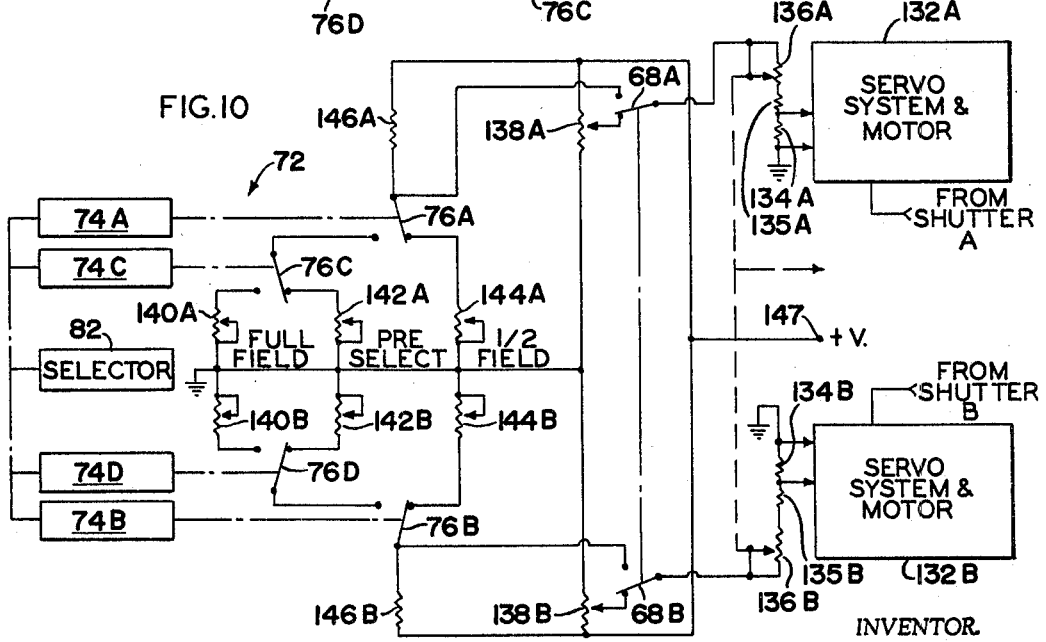
FIGURE 10 is a circuit diagram of a shutter control embodying the invention.

FIGURE 10 is a circuit diagram of a shutter control embodying the present invention. As shown, the circuitry is divided into two identical channels shown in the upper and lower parts of the figure. One channel controls the opening of one pair of shutters that define one dimension of the quadrangular shutter opening, and the other channel controls the opening of a second pair of shutters that define the second dimension of the quadrangular shutter opening. Each channel contains a servo system and motor, designated 132A and 132B, respectively, for the two channels. One input to each of the servo channels is a signal from its corresponding pair of shutters indicating the actual shutter opening. Another input to each of the servo channels is from analog circuitry; that input is a signal representing a desired shutter opening in the dimension corresponding to that particular channel. The inputs to the two channels are respectively taken from across fixed resistors 134A, 134B. One end of the resistor 134A is grounded, and its other end is connected through a fixed resistor 135A to one end of a potentiometer 136A, which is connected as a variable resistor. The resistor 134B is similarly connected through a fixed resistor 135B to a potentiometer 136B, also connected as a variable resistor. The other end of the potentiometer 136A is connected to the pole of a two-contact section 68A of the manual-automatic switch 68 shown in FIGURE 2. The end of the potentiometer 136B is similarly connected to the pole of another two-contact section 68B of the switch 68. The switch sections 68A, 68B are ganged together for simultaneous operation. The potentiometers 136A, 136B are physically located in the tower 28 that supports the spot filmer 30 and their movable arms are actuated by movement of the spot filmer to provide resistances that are proportional to the vertical position of the image plane (in the spot filmer). The potentiometers 136A, 136B are described in detail in the referenced Norgren application. The servo channels are shown and described in detail in the referenced Lombardo application and will not be again described here.

Variable voltage signals are supplied to the two analog circuits from the poles of the switch sections 68A, 68B, which voltages are proportional to a desired image field size for a particular exposure or sequence of exposures that it is desired to make. When the switch 68 is in its manual position as shown, these voltages are provided from the movable arms of potentiometers 138A, 138B, respectively, to the two channels. The movable arms of the potentiometers 138A, 138B are mechanically connected to the levers 70A, 70B, respectively, shown in FIGURE 2, so that the desired image field size may be manually adjusted. These controls behave like conventional cable controls, and no special technical instruction is required for an operator to use them. When the switches 68A, 68B are in the automatic position, signals are provided to the poles of the switches from the poles of the two-contact microswitches 76A, 76B, respectively. As previously noted, the switch 76A is actuatable by the cam 74A, and the switch 76B is actuatable by the cam 74B. As shown, the microswitches 76A, 76B, 76C, 76D are in their unactuated positions.

When the switch section 68A is in its automatic position, a signal may be supplied through its pole that is taken from across any one of three potentiometers 140A, 142A, 144A, each of which is connected as a variable resistor. Similarly, when the switch section 68B is in its automatic position, signals may be supplied to its pole from across any one of three potentiometers 140B, 142B, 144B, each of which is connected as a variable resistor. Depending upon the conditions of the switches 76A, 76C, one or another of the potentiometers 140A, 142A, 144A is placed in series with a fixed resistor 146A, with the series combination being connected between a source of positive voltage (not shown) at a terminal 147 and ground. Similarly, one or another of the potentiometers 140B, 142B, 144B is connected in series with a fixed resistor 146B connected in series between the terminal 147 and ground, the one of the potentiometers being so connected depending upon the condition of the switches 76B, 76D.

In the particular example chosen for illustration, the potentiometers 140A, 140B are set to provide signals to the switches 76C, 76D, respectively, that are proportional to a full size image field. The potentiometers 142A, 142B are set to provide signals at the switches 76C, 76D, respectively, that are proportional to a preselected image field size for fluoroscopy. The potentiometers 144A, 144B are set to provide signals to the switches 76A, 76B, respectively, that are proportional to one-half of the full image field dimensions. As previously pointed out, the cams 74 actuate the switches 76 in various combinations to provide the proper field size for the various single or sequential exposures desired.

Reference is now made to FIGURES 3, 8, 9 and 10, taken in conjunction with each other. Referring to those figures, it is seen that when the program selector knob 66 is positioned at any of stations S1–S4, both dimensions of the quadrangular image field are at one-half the full field dimensions. Thus, the switches 76A, 76B should be in the positions shown in FIGURE 10, that is, unactuated. As can be seen from FIGURE 8, the cams 74A, 74B are not provided with lands at stations S1–S4 so that the switches 76A, 76B are unactuated. The conditions of the switches 76C, 76D are unimportant, since they are not in circuit when the switches 76A, 76B are unactuated. However, the switches 76C, 76D are also unactuated at stations S1–S4. At station S5, the shutters are adjusted to provide the image field having preselected dimensions. This is accomplished by providing the cam 74A, 74B with lands to actuate respectively the switches 76A, 76B. The cams 74C, 74D are not provided with lands at station S5, so that the switches 76C, 76D remain unactuated as shown. At stations S6 and S7, it is desirable to provide a full-image field size in one dimension and a half-image field size in the other dimension. Therefore, the switch 76A is unactuated to provide a signal corresponding to one-half the full-image field size in one dimension, and the switches 76B, 76D are both actuated to provide a full-size image field in the other dimension. At station S8, the preselected image field size is again provided by actuation of the switches 76A, 76B while the switches 76C, 76D are unactuated. At stations S9 and S10, a full-image field size is provided in the first dimension by actuation of the switches 76A, 76C, while a half-size image field is provided in the other dimension because the switch 74B is unactuated. At station S11, actuation of the switches 76A, 76B while the switches 76C, 76D are unactuated again provides the preselected image field size. At station S12, all of the switches 76A, 76B, 76C, 76D are actuated to provide signals corresponding to the full-image field size. Stations S13 and S14 again provide the preselected image field size by actuation of the switches 76A, 76B while the switches 76C, 76D remain unactuated. These various conditions of the switches are set forth in the table of FIGURE 9.

FIGURE 11 illustrates the geometry necessary to an understanding of the invention. Although only a two-dimensional diagram is shown, it is understood that a third dimension is involved. In other words, only one dimension of the two dimensions (length and width) that define the shutter opening size and image field size are shown. A similar diagram could be drawn using height as one dimension and the other shutter opening and field dimensions as its other dimensions. As shown, A represents a desired image field dimension (a variable) in an image plane 150 (defined by the position of the spot filmer). B represents distance from a point source 152 (X-ray tube) to a shutter plane 154 (a constant). C represents a minimum allowable distance between the image plane 10 and the shutter plane 14 (a constant). D represents distance between the planes 150, 154 (a variable) minus the distance C, and E represents one dimension of the shutter opening (a variable).

The following proportionality equations can be written for the diagram of FIGURE 11:

$$\frac{E}{A} = \frac{B}{B+C+D} \tag{1}$$

or $$E = \frac{AB}{B+C+D} \tag{2}$$

It is noted that Equation 2 has the same form as the well-known electrical equation $I=V/R$, where I is current flowing through a resistance R, and V is voltage applied across the resistance R. It follows then that Equation 2 can be set up using electrical parameters rather than spacial parameters. FIGURE 12 shows a simple analog circut that may be used for solving that equation, two such circuits being employed to provide signals proportional to the two dimensions of the image field.

As shown, a potentiometer 156 having a movable arm 156A is connected across a source of direct current, shown as a battery 158. The negative side of the battery 158 is grounded. The position of the movable arm 156A of the potentiometer determines the voltage applied to the remainder of the circuit, and it is set to obtain a voltage that corresponds to the term A in Equation 2. The potentiometers 156 and the battery 158 are the equivalent of one of the potentiometers 138, 140, 142, 144 connected between the terminal 147 and ground (FIGURE 10) in one channel. The terms in the denominator of Equation 2 are represented by the series-connected potentiometer 136 and the resistors 134, 135 (also shown in FIGURE 10) connected between the potentiometer arm 156A and ground. The variable resistor (or potentiometer) 136 represents the variable distance D in Equation 2 and the resistors 135, 136, respectively, represent the constant distances B and C in that equation. The current that flows through the resistors 134, 135, 136 is a function of their resistance values and the potential applied across them from the arm 156A of the potentiometer 156. That current is a measure of the desired shutter opening E in Equation 2. A potential $V_R$ representing that shutter opening is taken from across the resistor 134, and is proportional to the current flowing through the resistors 134, 135, 136.

Thus, by utilizing two analog circuits as shown in FIGURE 10, signals proportional to length and width of a desired image field are provided to the servo channels and motors 132A, 132B.

It is pointed out that the shutter control of the present invention may also be utilized in conjunction with a phototube pickup arrangement for controlling the energization of the X-ray tube and hence the exposure of the X-ray film. It is present practice to use a phototube which has a sensitive pickup area equal in size and shape to the smallest image field area that will be utilized. This has usually been taken to be a 4 x 4 area. However, it cannot be guaranteed that this area will always be correct. For example, under manual shutter control conditions, a radiologist might wish to make a radiogram of a bone, in which case the radiogram could conveniently have an area of 2 x 8. It is apparent that a phototube having a 4 x 4 sensitive pickup area would, in this case, provide an indication that would result in a greatly overexposed radiogram (by a factor of 2).

By making the sensitive pickup area of the phototube equal to any predicted area, and modifying the output of the phototube in accordance with the actual radiograph area, an accurate exposure resulting in constant radiograph density can be obtained for all image field sizes. For example, if the pre-selected area is a maximum 8 x 8 field size and the actual field size is 4 x 4, the output of the phototube would be multiplied by a quantity proportional to $64/16$ or 4. Similarly, if the actual field size is 2 x 8, the phototube output would be multiplied by 4; if the actual field size is 4 x 8, the phototube output would be multiplied by 2. Thus, when the phototube output is multiplied by a quantity proportional to preselected field area divided by actual field area, uniform density radiographs will result.

Quantities proportional to the actual image field dimensions can conveniently be obtained from across the resistors 134A, 134B shown in FIGURE 10. Conventional circuitry can then be utilized to multiply these quantities together to obtain a quantity proportional to the actual image field size and to modify the phototube output signal in the foregoing manner.

Although an embodiment of the invention has been shown and described in detail, it is apparent that many changes and modifications may be made by one skilled in the art without departing from the true spirit and scope of the invention.

What is claimed is:

1. In X-ray apparatus having a source of radiation for imaging on an image plane an object under examination, and movable shutter means interposed between said source and said object and providing a variable-size shutter opening for defining various preselected image field sizes, a shutter control comprising:
   (a) manually-controllable selector means for selecting one of a plurality of exposure programs, each program having an X-ray exposure sequence of one or more exposure positions, each exposure of each sequence utilizing a predetermined one of a plurality of image field sizes;
   (b) first switch means automatically actuated by said selector means for providing output signals for each exposure position that are proportional to dimensions of a proper one of said preselected image field sizes corresponding to the exposures of the one of said exposure programs selected by said selector means;
   (c) switch actuating means interconnecting said selector means and said first switch means; and
   (d) servo means responsive to said output signals for moving said shutter means to vary said shutter means opening to provide said proper one of said preselected image field sizes.

2. The control of claim 1, wherein said exposure programs include a full image field size exposure, an exposure of a preselected image field size, an exposure sequence of four different quarter-size image fields, an exposure sequence of two longitudinally divided, half-size image fields, and an exposure sequence of two transversely divided half-size image fields.

3. The control of claim 1, wherein said switch actuating means are mechanically connected between said selector means and said first switch means.

4. The control of claim 1, further including second switch means manually actuatable to electrically disable said first switch means, and shutter means opening control means for manually adjusting said shutter opening when said first switch means is electrically disabled.

5. The control of claim 1, wherein said selector means is automatically stepped through exposures of a selected program and finally stepped to a rest position when a sequence is completed.

6. The control of claim 5, wherein said rest position provides an image field size of preselected dimensions.

7. The control of claim 1, wherein said switch actuating means comprises cam means.

8. The control of claim 7, wherein said cam means comprises length cam means and said first switch means comprises length switch means actuatable by said length cam means for controlling length of said quadrangular shutter opening.

9. The control of claim 7, wherein said cam means comprises width cam means and said first switch means comprises width switch means actuatable by said width cam means for controlling width of said quadrangular shutter opening.

10. The control of claim 7, wherein said cam means comprises length cam means and width cam means, and said first switch means comprises length switch means and width switch means both selectively actuatable respectively by said length cam means and said width cam means for respectively controlling length and width of said quadrangular shutter opening.

11. The control of claim 10, further including second switch means manually actuatable to electrically disable said first switch means, and shutter opening control means for manually adjusting said shutter opening when said first switch means is electrically disabled.

12. The control of claim 10, wherein said selector means is automatically stepped through exposures of a selected program and finally stepped to a rest position when a sequence is completed.

13. The control of claim 10, wherein said length switch means are selectively actuatable by said length cam means to provide a first one of said output signals proportional to full shutter opening, one-half full shutter opening, and a preselected shutter opening, all in one dimension of said quadrangular shutter opening.

14. The control of claim 13, further including second switch means manually actuatable to electrically disable said first switch means, and shutter opening control means for manually adjusting said shutter opening when said first switch means is electrically disabled.

15. The control of claim 13, wherein said selector means is automatically stepped through exposures of a selected program and finally stepped to a rest position when a sequence is completed.

16. The control of claim 15, wherein said rest position provides an image field size of preselected dimensions.

17. The control of claim 10, wherein said width switch means are selectively actuatable by said width cam means to provide a second one of said output signals proportional to full shutter opening, one-half full shutter opening, and a preselected shutter opening, all in a second dimension of said quadrangular shutter opening.

18. The control of claim 17, further including second switch means manually actuatable to electrically disable said first switch means, and shutter opening control means for manually adjusting said shutter opening when said first switch means is electrically disabled.

19. The control of claim 17, wherein said selector means is automatically stepped through exposures of a selected program and finally stepped to a rest position when a sequence is completed.

20. The control of claim 19, wherein said rest position provides an image field size of preselected dimensions.

21. The control of claim 10, wherein said length and width switch means are respectively selectively actuatable by said length and width cam means to provide respectively a first one of said output signals selectively proportional to full shutter opening, one-half full shutter opening, and a preselected shutter opening, all in a length dimension of said quadrangular shutter opening, and a second one of said output signals selectively proportional to full shutter opening, one-half full shutter opening, and a preselected shutter opening, all in a width dimension of said quadrangular shutter opening.

22. The control of claim 21, further including second switch means manually actuatable to electrically disable said first switch means, and shutter opening control means for manually adjusting said shutter opening when said first switch means is electrically disabled.

23. The control of claim 21, wherein said selector means is automatically stepped through exposures of a selected program and finally stepped to a rest position when a sequence is completed.

24. The control of claim 23, wherein said rest position provides an image field size of preselected dimensions.

References Cited

UNITED STATES PATENTS

| | | | |
|---|---|---|---|
| 2,846,630 | 8/1958 | Boyle et al. | 318—20.821 |
| 2,921,202 | 1/1960 | Berger et al. | 250—105 |
| 3,130,313 | 4/1964 | Tilling | 250—105 |
| 3,173,008 | 3/1965 | Barrett et al. | 250—66 |

RALPH G. NILSON, Primary Examiner

A. L. BIRCH, Assistant Examiner

U.S. Cl. X.R.

250—93, 105